(12) United States Patent
Heidan et al.

(10) Patent No.: US 9,376,000 B2
(45) Date of Patent: Jun. 28, 2016

(54) ROOF SYSTEM FOR A MOTOR VEHICLE

(71) Applicants: Michael Heidan, Stuttgart (DE); Hartmut Eberst, Schwaebisch Gmuend (DE); Marius Marquart, Friolzheim (DE)

(72) Inventors: Michael Heidan, Stuttgart (DE); Hartmut Eberst, Schwaebisch Gmuend (DE); Marius Marquart, Friolzheim (DE)

(73) Assignee: BOS GMBH & CO. KG, Ostfildern (DE)

( * ) Notice: Subject to any disclaimer, the term of this patent is extended or adjusted under 35 U.S.C. 154(b) by 0 days.

(21) Appl. No.: 14/646,861

(22) PCT Filed: Nov. 21, 2013

(86) PCT No.: PCT/EP2013/074417
§ 371 (c)(1),
(2) Date: May 22, 2015

(87) PCT Pub. No.: WO2014/082920
PCT Pub. Date: Jun. 5, 2014

(65) Prior Publication Data
US 2015/0306942 A1    Oct. 29, 2015

(30) Foreign Application Priority Data

Nov. 29, 2012   (DE) .......................... 10 2012 221 845
Dec. 19, 2012   (DE) .......................... 10 2012 223 709

(51) Int. Cl.
*B60J 7/043*    (2006.01)
*B60J 7/02*     (2006.01)
*B60J 7/185*    (2006.01)

(52) U.S. Cl.
CPC ................ *B60J 7/0435* (2013.01); *B60J 7/024* (2013.01); *B60J 7/1856* (2013.01)

(58) Field of Classification Search
CPC .............. B60J 7/02; B60J 7/022; B60J 7/024; B60J 7/043; B60J 7/0435; B60J 7/047
USPC .......................... 296/216.02–216.05, 220.01
See application file for complete search history.

(56) References Cited

U.S. PATENT DOCUMENTS 4,746,165 A    5/1988  Fuerst et al.
4,877,285 A *  10/1989 Huyer .................... B60J 7/0435
                                                    296/216.03

(Continued)

FOREIGN PATENT DOCUMENTS

DE    10 2004 042 450 A1    3/2006
DE    10 2006 002 064 A1    11/2007

(Continued)

OTHER PUBLICATIONS

International Search Report issued in Application No. PCT/EP2013/074417 with English translation dated Jun. 10, 2014 (10 pages).

*Primary Examiner* — Dennis H Pedder
(74) *Attorney, Agent, or Firm* — Flynn, Thiel, Boutell & Tanis, P.C.

(57) ABSTRACT

Roof system for a motor vehicle having a fixed roof cutout and having a movably mounted roof part for closing and opening the roof cutout which is displaceable by a tilt and guide mechanism between a closed position, a tilt position and an open position. The tilt and guide mechanism includes on both sides of the roof part in each case a front tilt lever and a rear tilt lever pivotably connected to the roof part by means of a pivot point and operatively connected to a control carriage movable in a guide rail arrangement. The roof part pivot points of the front and of the rear tilt lever are interconnected by an integral, dimensionally stable fastening profile extending along a side edge of the roof part and fastened on the side edge thereof.

21 Claims, 8 Drawing Sheets

(56) References Cited

U.S. PATENT DOCUMENTS

| | | |
|---|---|---|
| 6,877,799 B2 | 4/2005 | Seifert et al. |
| 7,878,581 B2 | 2/2011 | Faerber et al. |
| 2003/0184128 A1 | 10/2003 | Seifert et al. |
| 2005/0231007 A1 | 10/2005 | Oechel |
| 2007/0228779 A1 | 10/2007 | Stallfort |
| 2010/0164253 A1 | 7/2010 | Faerber et al. |

FOREIGN PATENT DOCUMENTS

| | | |
|---|---|---|
| DE | 10 2007 004 258 A1 | 7/2008 |
| EP | 1 334 858 A1 | 8/2003 |
| EP | 1 844 967 A1 | 10/2007 |
| FR | 2 601 303 A1 | 1/1988 |
| WO | WO 2006/086958 A1 | 8/2006 |
| WO | WO 2007/079747 A1 | 7/2007 |

* cited by examiner

ROOF SYSTEM FOR A MOTOR VEHICLE

FIELD OF THE INVENTION

The invention relates to a roof system for a motor vehicle having a fixed roof cutout and having a movably mounted roof part for closing and opening the roof cutout which is displaceable by means of a tilt and guide mechanism between a closed position, a tilt position and an open position, wherein the tilt and guide mechanism includes on both sides of the roof part in each case—when viewed in the direction of travel of the motor vehicle—a front tilt lever and a rear tilt lever which are pivotably connected to the roof part in each case by means of a pivot point and are operatively connected to a control carriage which is movable in a guide rail arrangement.

BACKGROUND OF THE INVENTION

A roof system of this type is known from DE 10 2007 004 258 A1. The known roof system comprises a movable roof part which serves for opening and closing a roof cutout. The movable roof part is displaceable between its closed position and its open position by means of a tilt and guide mechanism. The tilt and guide mechanism comprises on opposite sides of the roof part in each case a front and a rear tilt lever, both of which are movable in each case in a guide rail arrangement. A control carriage, which actuates the rear tilt lever by means of a control linkage, is provided for actuating the tilt lever.

SUMMARY OF THE INVENTION

It is the object of the invention to create a roof system of the type mentioned in the introduction which is designed in a compact manner and enables reliable and low-maintenance operation.

Said object is achieved for a roof system of the type described in the introduction as a result of each guide rail arrangement comprising two guide planes which are arranged one above the other and are parallel to one another, wherein a guide carriage of the front tilt lever is arranged so as to be longitudinally displaceable in one guide plane and the control carriage and the rear tilt lever are mounted so as to be longitudinally displaceable in the other guide plane. As a result, a particularly compact design of the tilt and guide mechanism is achievable. By dividing the sliding guides into two different guide planes, the guide rail arrangement is subject to reduced wear.

In the development of the invention, the front tilt lever is mounted by way of a pivot point on a guide carriage, the rear tilt lever is mounted on the control carriage, and the guide carriage includes a control lever, which comprises a latching means, in particular a latching web, for latching in a latching recess of the guide rail arrangement, and an entrainment portion, by means of which the guide carriage is entrainable by the control carriage in the longitudinal direction of the guide rail arrangement. As a result, in a particularly simple manner, a blocking of the front tilt lever is achieved during a tilt movement of the rear tilt lever in order to be able to raise a rear edge region of the roof part beyond a roof surface contour. The control carriage for the rear tilt lever can be designed in an essentially simpler manner as it just has to entrain the guide carriage for the front tilt lever as soon as the entire roof part is tilted and is able to be moved rearward beyond a fixed roof portion. Compared to the prior art, the individual components are less complex, fewer parts are required and the components themselves can be designed in a simpler manner.

In a further development of the invention, the control lever is guided so as to be movable between a latching position in the latching recess and an entrainment position on the control carriage. The control lever is forcibly guided over its entire movement path and can be provided with a joint in order to allow the movement.

In a further development of the invention the control lever is arranged integrally on the guide carriage and is movable as a result of the elasticity of the material. The control lever consequently forms a flexure joint. The control lever can be produced as a plastics material component integrally with the guide carriage which also consists of plastics material. As an alternative to this, it is possible to produce the control lever separately and then to connect it fixedly to the guide carriage in order to obtain the integral arrangement of the control lever on the guide carriage. The integral arrangement can be effected in particular as a result of latching the control lever with the guide carriage in a positive locking manner.

In a further development of the invention, the front tilt lever includes a support bearing for transferring the tilt lever from a front guide continuation into an upper guide plane of the guide rail arrangement, wherein the support bearing is formed in particular by two slide shoes which flank the tilt lever on the inside and on the outside. As a result, symmetrical supporting is achieved in the guide rail arrangement, as a result of which particularly sturdy and secure guiding for the support bearing of the front tilt lever is produced.

In a further development of the invention, the guide carriage is produced from plastics material as a bearing block for a rear pivot bearing of the front tilt lever, and the control lever is integrally molded in one piece on the bearing block and projects rearward in the direction of the control carriage. This is a particularly simple and cost-efficient development.

In a further development of the invention, the control carriage comprises a control linkage for actuating the rear tilt lever and a support and entrainment profiling for controlling the control lever between its latching and its entrainment position. The control carriage consequently includes a dual function as on the one hand it assumes the actuating function of the rear tilt lever and on the other hand is operatively connected to the control lever in such a manner that—depending on the position of the roof part—it secures the latching position of the control lever or entrains the control lever together with the guide carriage for the front tilt lever. The entrainment of the control lever and consequently of the guide carriage by means of the control carriage is effected mechanically in a positive locking manner.

In a further development of the invention, the control linkage is provided as a plastic-coated metal web. The metal web ensures a high level of stability for the corresponding portion of the control carriage.

In a further development of the invention, a drive transmitting means in the form of a longitudinally extended push-pull means cooperates with the control carriage. The push-pull means is preferably a flex shaft which is displaceable by means of an electric drive unit. One single electric drive unit is preferably provided in order to move the two flex shafts on opposite sides of the tilt and guide mechanism in a synchronous manner.

In a further development of the invention, an entrainment cam, which engages in a positive locking manner into a complementary receiving means on the control carriage, is integrally molded on an end-face region of the push-pull means. As a result, a particularly simple connection between the push-pull means, in particular the flex shaft, and the control carriage is achievable.

In a further development of the invention, it is provided that the roof part pivot points of the front and of the rear pivot lever are interconnected by means of an integral, dimensionally stable fastening profile which extends along a side edge of the roof part and is fastened on the side edge of the roof part. As a result, even in a pre-assembly position, a sturdy association between the front and the rear tilt lever is achieved. By the integral and dimensionally stable fastening profile extending continuously between the front and the rear tilt lever and being connected to the side edge of the roof part, the roof part is supported in a particularly sturdy and operationally reliable manner.

In a further development of the invention, more than two fastening points, at which the fastening profile is fastened on the roof part, are provided distributed over a length of the fastening profile. Preferably, at least three fastening points are provided in order to secure the roof part on the fastening profile. As a result, a particularly sturdy connection between the roof part and the tilt and guide mechanism is achieved which, once again, serves for synchronizing the two drive sides of the tilt and guide mechanism in a particularly good manner by means of transmission by the roof part onto the respective other side.

In a further development of the invention, the guide rail arrangement is provided at the front with two linkage elements which form the guide continuation, are mirror-symmetrical to one another, are provided for slidingly guiding the slide shoes of the support bearing from a lower rest position into the upper guide plane and flank the support bearing on the outside and on the inside. As a result, the support bearing is supported in a particularly secure manner on the outside and on the inside, i.e. toward the vehicle center and toward the vehicle outside, such that guiding the front tilt lever in a particularly sturdy and secure manner from the rest position in the direction of the upper guide plane is achievable. The linkage elements can be produced as separate linkage inserts and can be connected to the guide rail arrangement. As an alternative to this, the linkage elements can be formed as integral continuations from the guide rail arrangement. In an advantageous manner, the integral continuations are plastically deformable such that the continuations are able to be bent to the desired form.

In a further development of the invention, the latching recess is provided with a plastics material insert. The plastics material insert enables, along with noise damping, the development of a defined insert geometry such that good adaptation between the plastics material insert and the latching means of the control lever is achievable.

BRIEF DESCRIPTION OF THE DRAWINGS

Further advantages and features of the invention are evident from the following description of a preferred exemplary embodiment of the invention, which is shown by way of the drawings, in which.

DETAILED DESCRIPTION

Figure 1:
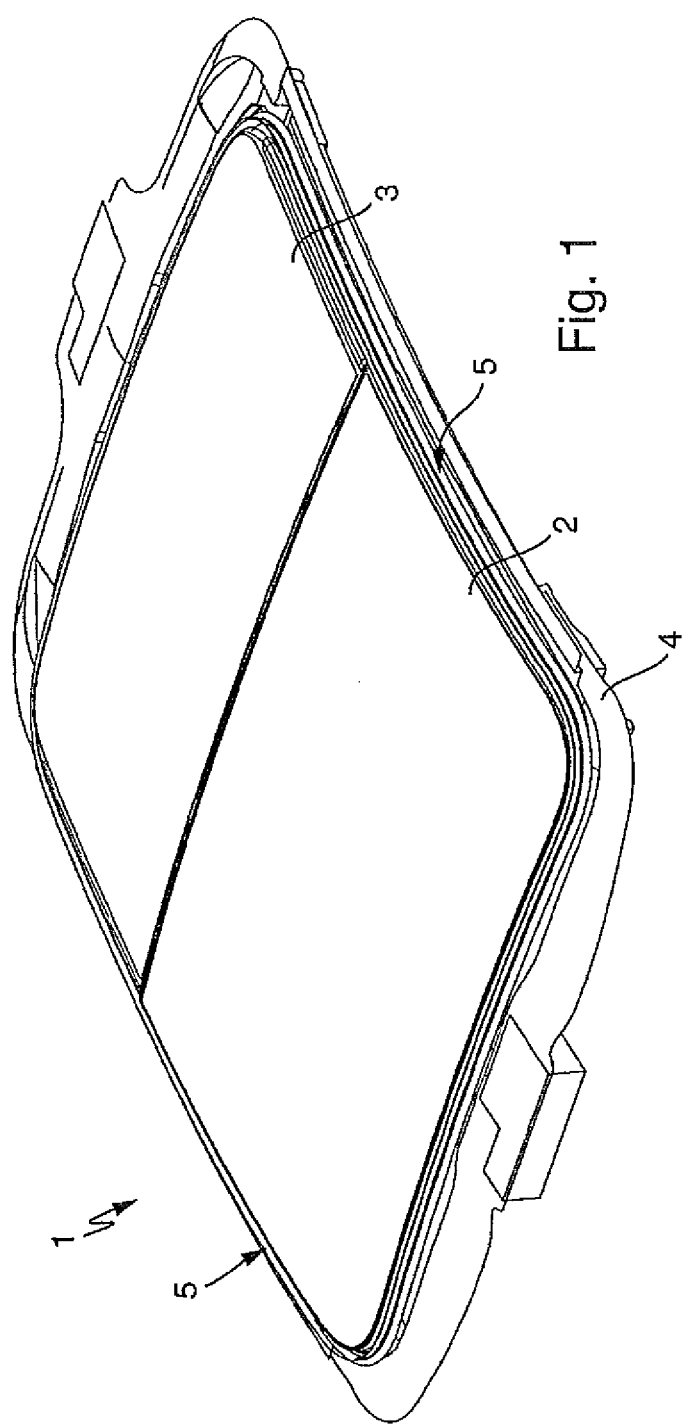
FIG. 1 shows a schematic representation of an embodiment of a roof system according to the invention, with the movable roof part in a closed position.
Figure 2:
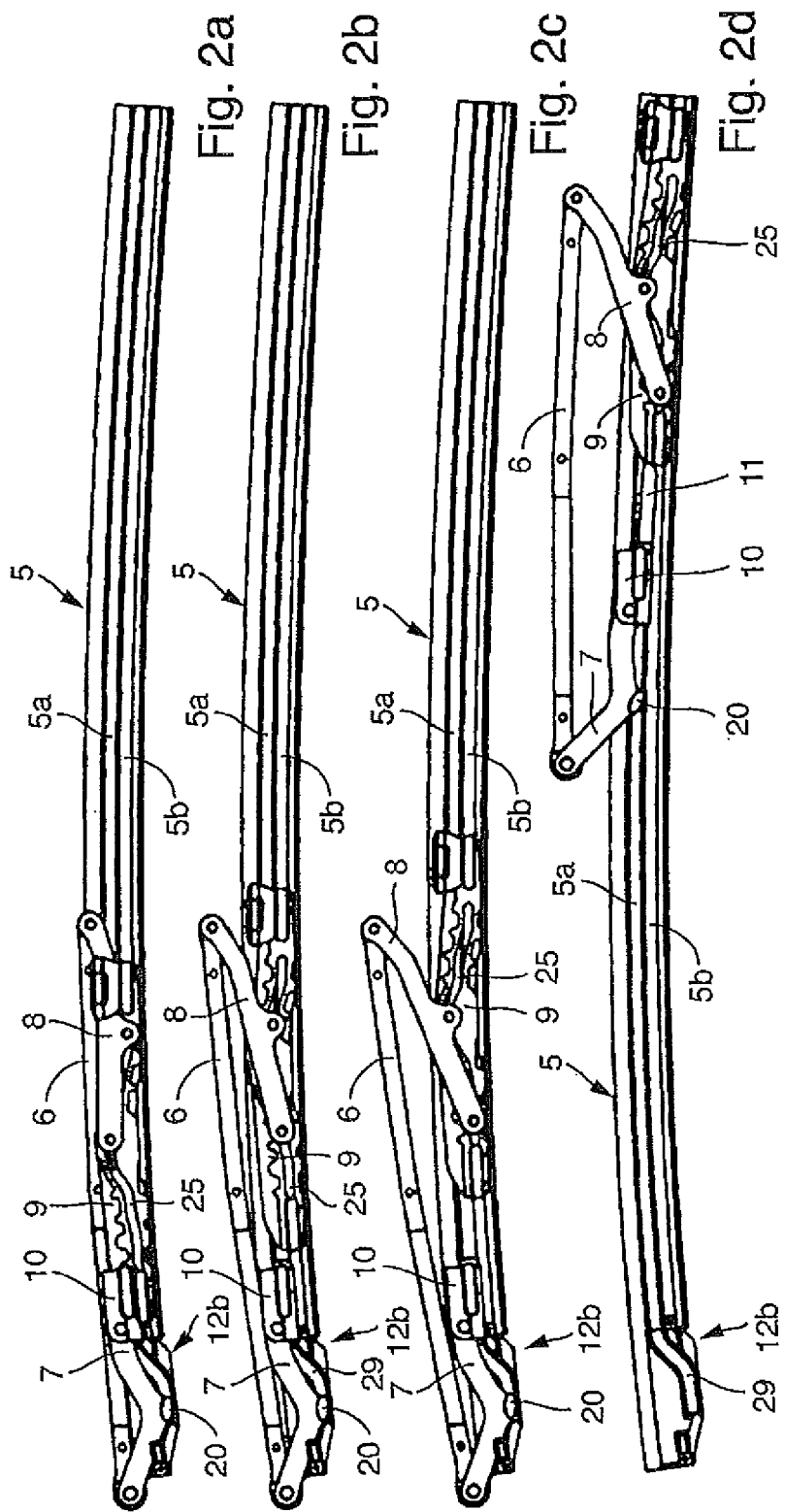
FIGS. 2a to 2d show a representation sectioned in the longitudinal direction of a side of a tilt and guide mechanism for the movable roof part according to FIG. 1, in various operating positions.
Figure 3:
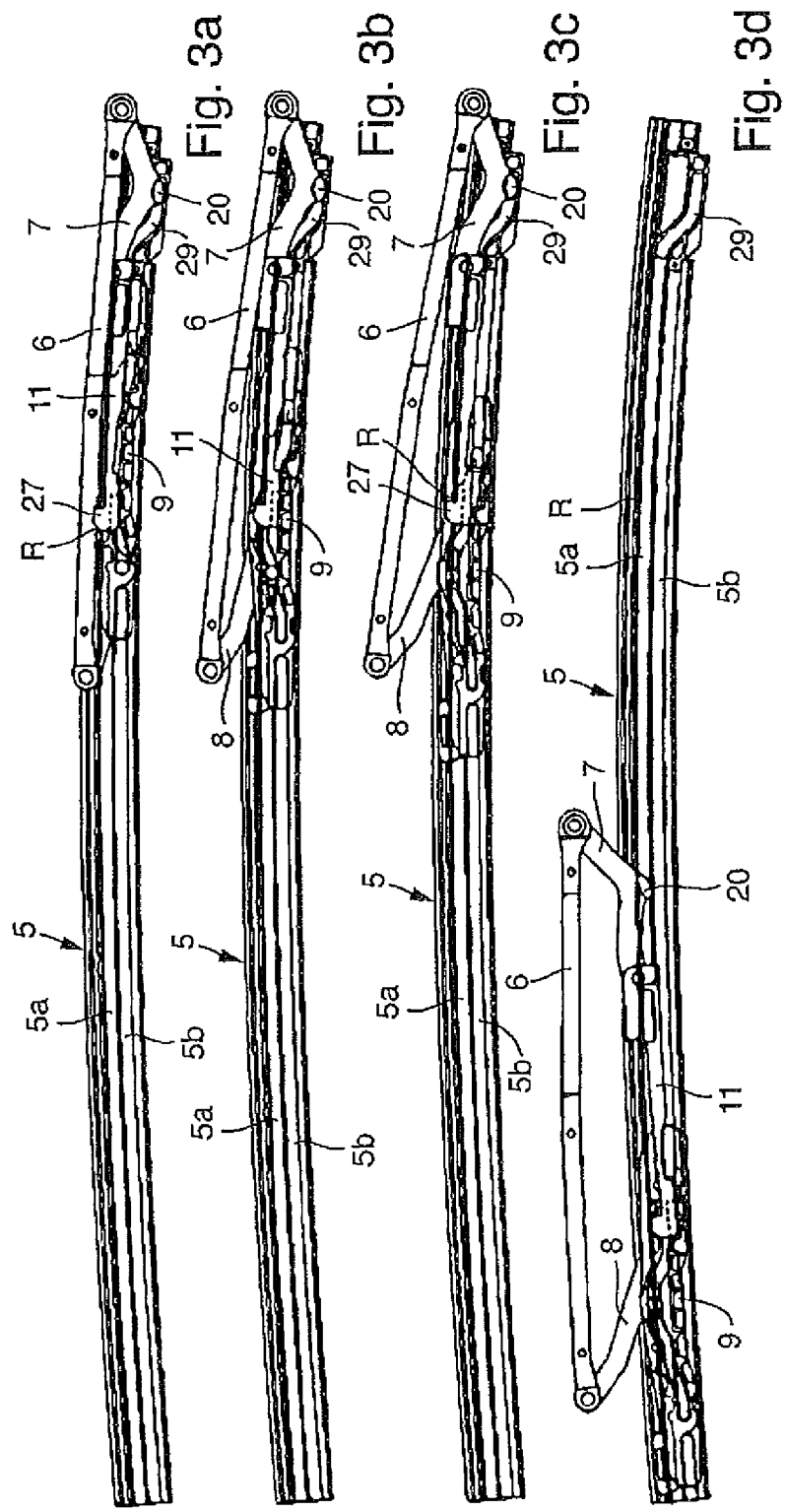
FIGS. 3a to 3d show the tilt and guide mechanism according to FIGS. 2a to 2d, however when viewed not from the outside, but from the inside.

A roof system 1, as is described below by way of FIGS. 1 to 11, is provided for a passenger vehicle and is incorporated in a roof region of a vehicle body of the passenger vehicle. The roof system 1 comprises a cover-shaped, movable roof part which consists of tinted glass. The roof part 2 serves for opening and closing a roof cutout, through which fresh air and light is able to pass from above into a vehicle interior of the passenger vehicle. A fixed and consequently stationary roof portion 3, which is also produced from tinted glass, connects to the movable roof portion 2 at the back, when viewed in the normal direction of travel. The movable roof part 2 and the stationary roof portion 3 are incorporated in a sturdy frame 4 which enables the roof system 1 to be pre-mounted and is connected in a suitable manner to corresponding portions of the vehicle body for installation into the roof region of the passenger vehicle. The roof system 1 is sealingly fitted into the roof region of the passenger vehicle. On each of the two opposite longitudinal sides of the roof system 1, which in the installed state extend at least extensively in the longitudinal direction of the vehicle, the dimensionally stable frame 4 includes one guide rail arrangement 5 which serves for the guiding and bearing arrangement of a tilt and guide mechanism for tilting and displacing the movable roof part 2 between its closed position and its open position which opens the roof cutout entirely.

The tilt and guide mechanism is provided with identical component arrangements on opposite longitudinal sides of the roof part 2, from which just the left-hand side—when viewed in the normal direction of travel—is shown below by way of FIGS. 2a to 10b. The right-hand side of the tilt and guide mechanism, which is associated with the opposite guide rail arrangement 5, is designed identically but is realized in a mirror-symmetrical manner with respect to a vertical median longitudinal plane of the passenger vehicle. Said right-hand side that is not shown in the drawings is accordingly constructed in an analogous manner to the left-hand side such that the description according to the drawings according to FIGS. 2a to 10b is also applicable in the same way to the right-hand side of the tilt and guide mechanism.

Figure 4:
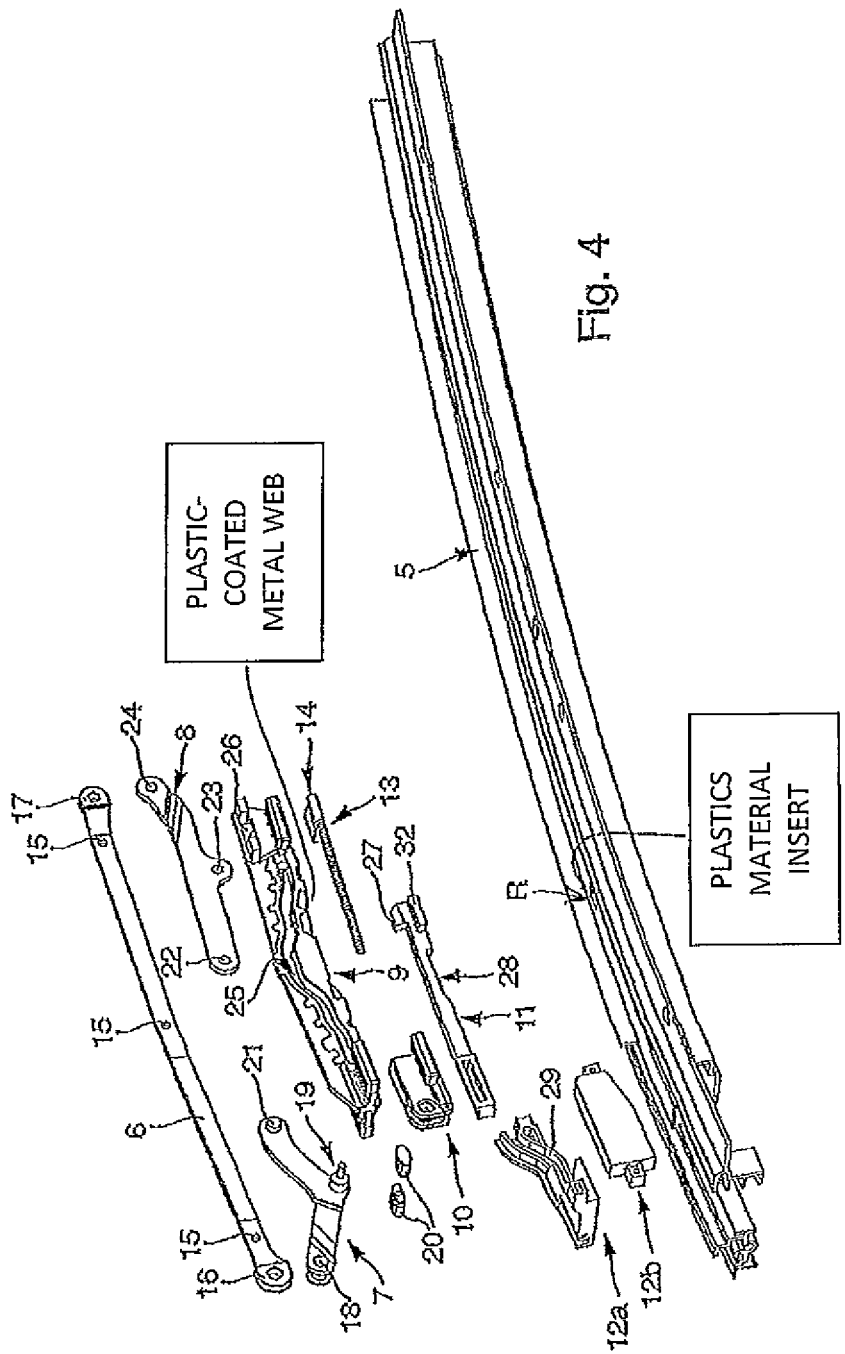
FIG. 4 shows an isometric exploded drawing of a left-hand side of the tilt and guide mechanism according to FIGS. 2a to 3d when seen from the outside.
Figure 5:
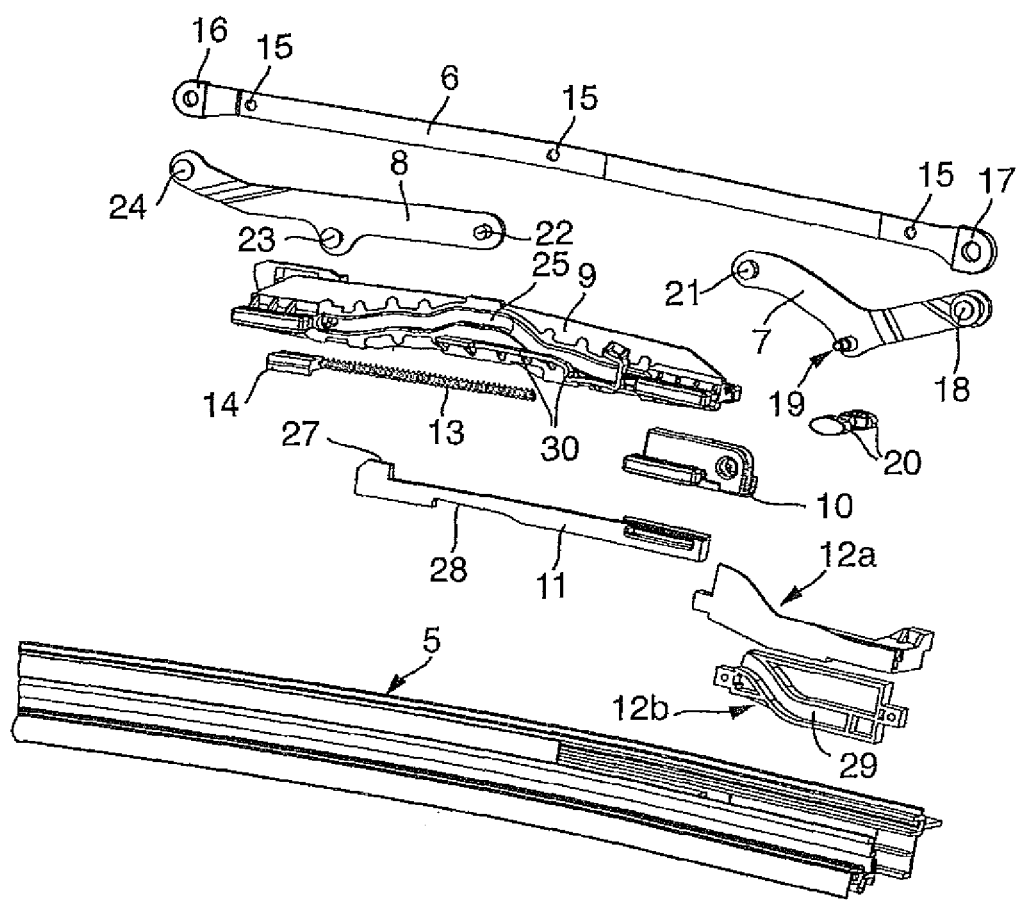
FIG. 5 shows an isometric exploded drawing of the left-hand side of the tilt and guide mechanism according to the FIG. 4 when seen from the inside.
Figure 6A:
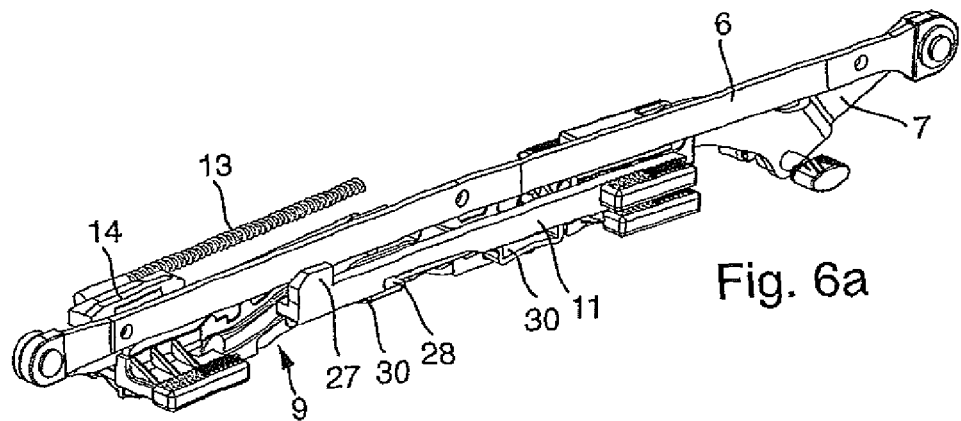
FIG. 6a and 6b show an isometric drawing of a left-hand part of the tilt and guide mechanism with the omission of the guide rail arrangement, from the outside and from the inside.
Figure 6B:
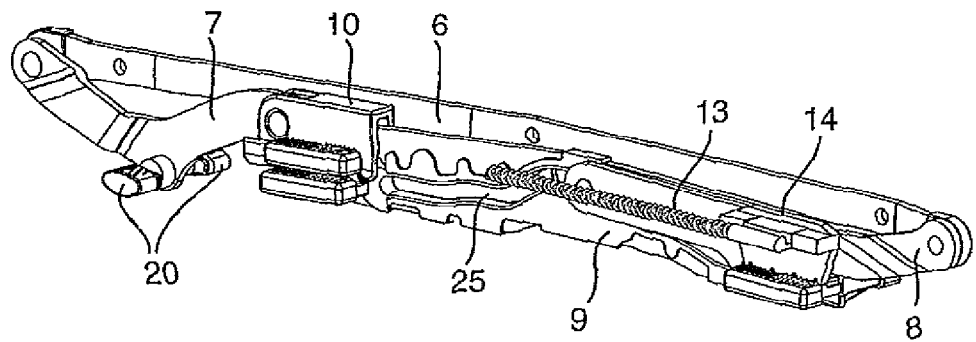
Figure 7A:
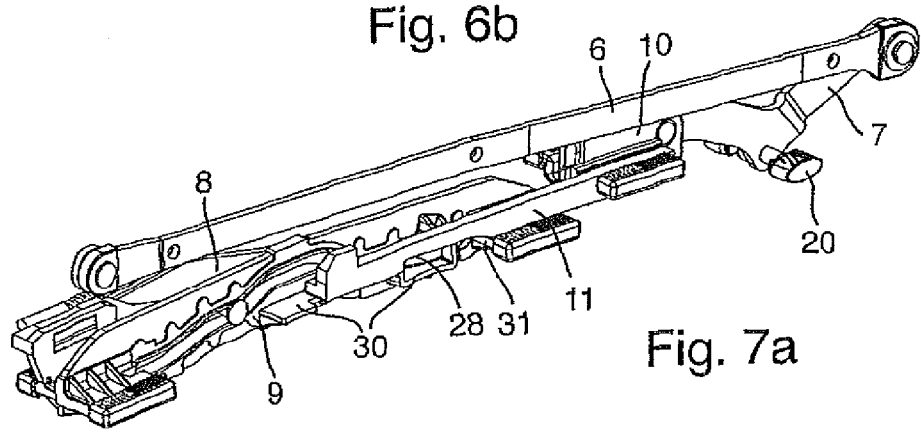
FIG. 7a and 7b show the component arrangement according to FIGS. 6a and 6b in an intermediate position according to FIGS. 2b and 3b.
Figure 7B:
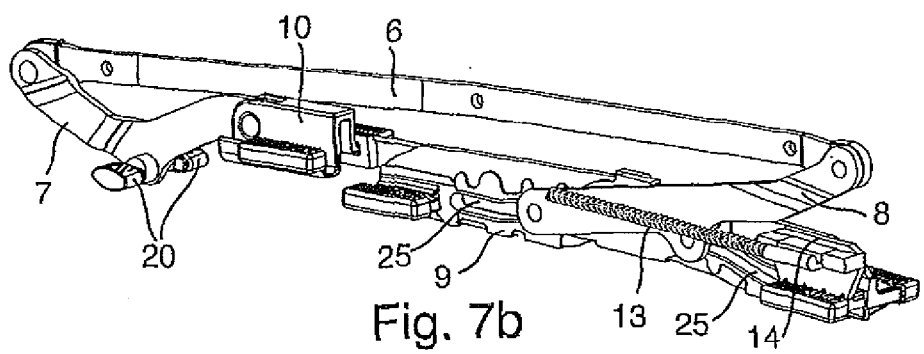
Figure 8A:
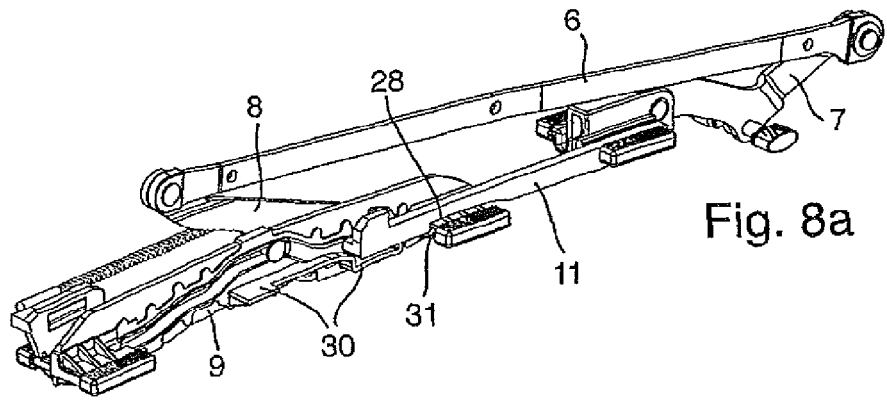
FIG. 8a and 8b show the component arrangement according to FIGS. 6a and 6b in a tilt position according to FIGS. 2c and 3c.
Figure 8B:
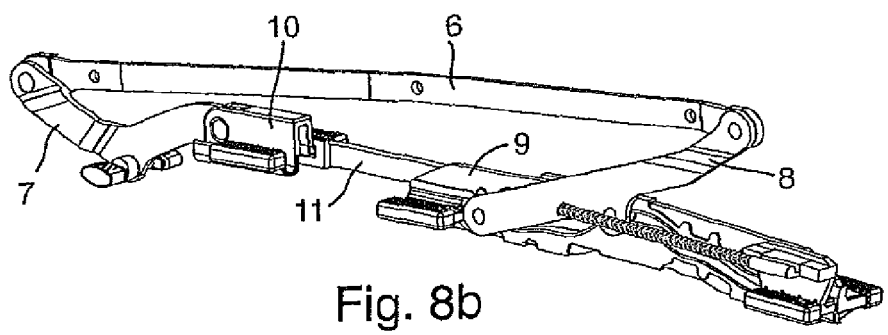
Figure 9A:
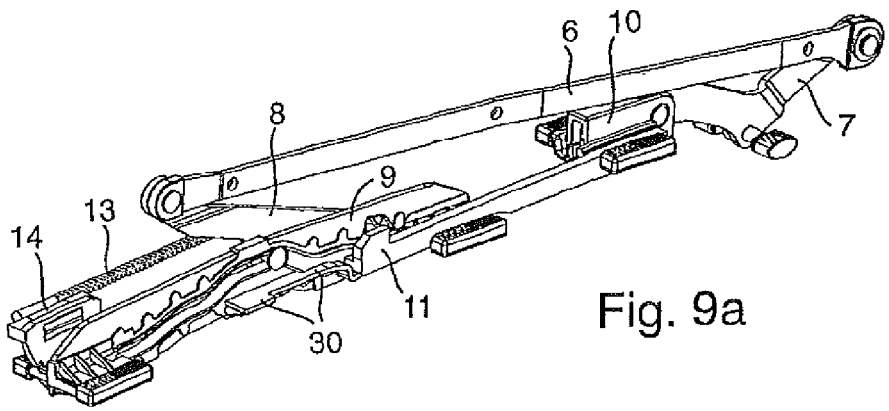
FIG. 9a and 9b show the component arrangement according to FIGS. 8a and 8b in a latched-in entrainment position between a control carriage and a control lever of a front tilt lever.
Figure 9B:
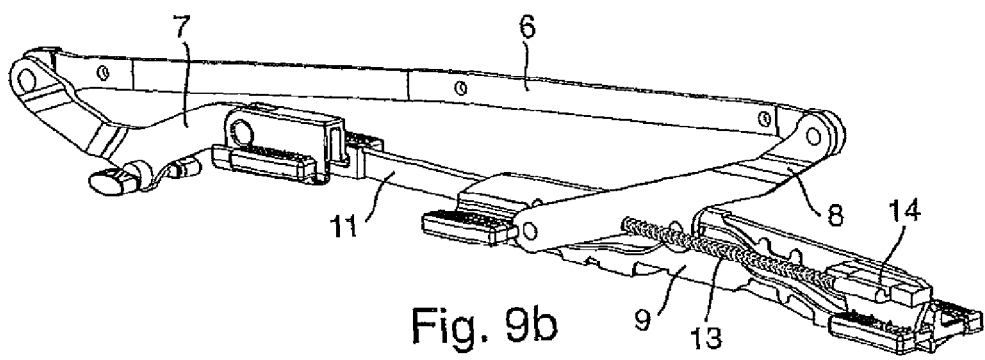
Figure 10A:
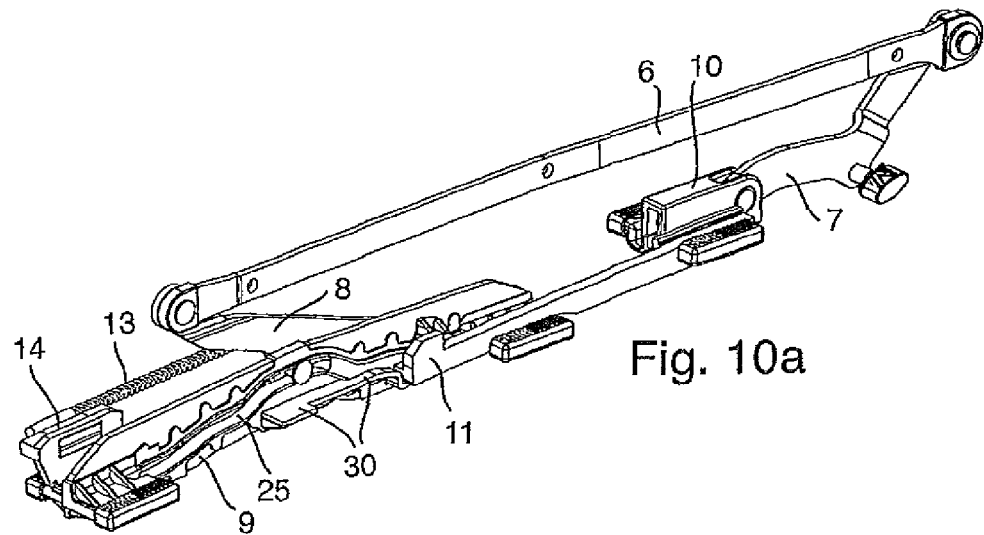
FIGS. 10a and 10b show the component arrangement according to FIGS. 6a to 9b with the roof part in a completely extended open position analogous to FIGS. 2d and 3d.
Figure 10B:
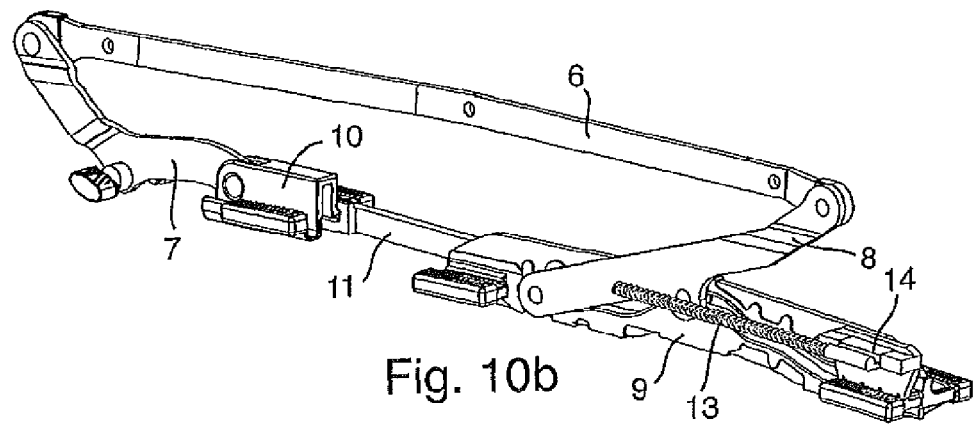

The individual parts and portions of the component arrangement of the left-hand side of the tilt and guide mechanism are described in more detail below by way of the exploded drawings according to FIGS. 4 and 5.

The component arrangement comprises a fastening profile 6 which is fixedly connectable by means of three fastening points 15, which are distributed over its length, to a side edge of the movable roof part 2, preferably as a result of screw-connecting or riveting. The fastening profile 6 comprises—when viewed in the normal direction of travel of the passenger vehicle—a front pivot point 16 on its front end face and a rear pivot point 17 on its rear end face. A front lever continuation of a front tilt lever 7 is pivotably mounted on the front pivot point 16 by means of a bearing bolt 18. A rear extension arm of a rear tilt lever 8 is pivotably mounted on the rear pivot point 17 by means of a bearing bolt 24.

The front tilt lever 7 comprises a V-like design and is mounted on a guide carriage 10 so as to be pivotable by means of a bearing bolt 21 by way of a rear leg continuation. The front tilt lever 7 is additionally provided centrally with a support bearing 19 which is fastened on the tilt lever 7 in a connecting region between the front lever continuation and the rear extension arm. The support bearing 19 comprises bearing journals which protrude transversely with respect to the direction of movement of the tilt lever 7 toward its opposite sides, one slide shoe 20 being fitted in each case on each bearing journal.

The guide carriage 10, to which the rear extension arm of the tilt lever 7 is pivotably connected, is produced from plastics material in the manner of a block-shaped component and comprises a slide shoe on each of its opposite longitudinal sides. The guide carriage 10 is mounted so as to be longitudinally displaceable in an upper guide plane 5a of the guide rail arrangement 5 by means of the slide shoes. A control lever 11, which is produced in one piece of plastics material, is integrally connected to the guide carriage 10. From a rear side of the guide carriage 10 in the longitudinal direction, the control lever 11 extends rearward in the direction of the rear tilt lever 8. The control lever 11 is produced from thermoplastic plastics material and in the non-loaded rest position comprises a slight curvature downward such that, in the non-loaded rest state, the control lever 11 is curved downward from the guide carriage 10 in a slight arc-shaped manner in relation to the a slide plane of the guide carriage 10. On its end face remote from the guide carriage 10, the control lever 11 comprises, on the one hand, an upwardly protruding latching web 27 and, on the other hand, a support cam 32 (FIG. 4) which protrudes toward the side and is flush with a bottom surface of the control lever 11 by way of its bottom surface.

The rear tilt lever 8 is displaceably mounted in a control linkage 25 of a control carriage 9 by means of a sliding bolt 23 which is arranged centrally in the region of its bottom surface and by means of a further sliding bolt 22 which is provided in the region of its front side. The control carriage 9 is also displaceably mounted in the bottom guide plane 5b of the guide rail arrangement 5 by means of a pair of slide shoes in the region of its front end and by means of a pair of slide shoes in the region of its rear end. The control carriage 9 —when viewed in the direction of travel of the passenger vehicle —is arranged at a spacing behind the guide carriage 10. The form of the control linkage 25 can be seen in particular in FIGS. 4 and 5. The control linkage 25 is provided in the form of a web body which projects upward in a sword-shaped manner and is realized as a plastic-coated metal web (shown diagrammatically in FIG. 4). In the region of an inside surface facing toward the vehicle center, the control carriage 9 comprises an inwardly projecting support web arrangement 30 which interacts with the support cam 32 and the bottom surface of the control lever 11 when the entire component arrangement is in the mounted operating position. The support web arrangement 30 holds the control lever 11 in a part portion of the movement sequence, which is described in more detail below, in a support position which in relation to its non-loaded rest position is tensioned upward, is aligned in a somewhat linear manner and in which the control lever 11 is held pressed upward in a pre-stressed manner on account of the elasticity of its material.

The control carriage 9 is moved in both longitudinal directions of the guide rail arrangement 5 by means of a drive transmission means in the form of a flex shaft 13. To this end, an entrainment cam 14, which is fitted in a positive locking manner into a complementary receiving means 26 on the control carriage 9, is integrally molded on a front end face of the flex shaft 13 in order to enable play-free entrainment of the control carriage 9 rearward or forward in the longitudinal direction of the vehicle when the flex shaft 13 is moved in a corresponding longitudinal manner.

Over its entire length continuously, the guide rail arrangement 5 comprises two guide profilings which are arranged one on top of the other and form a lower guide plane 5b and an upper guide plane 5a. The flex shaft 13 is associated with the lower guide plane 5b. The control carriage 9 is mounted so as to be longitudinally displaceable in the lower guide plane 5b by means of the flex shaft 13. The front guide carriage 10, in contrast, is mounted so as to be longitudinally displaceable in the upper guide plane 5a by means of two slide shoes.

In the region of an upper boundary wall of the upper guide plane 5a, the guide rail arrangement 5 comprises a latching recess R (see FIG. 4 and FIGS. 3a to 3d) into which the latching web 27 of the control lever 11 is latchable in the manner described in more detail below. The latching recess R, in one embodiment, includes a plastics material insert (shown diagrammatically in FIG. 4).

A double-shell guide continuation 12a, 12b which includes an S-curve-shaped control curve 29 is additionally associated with the front of the guide rail arrangement 5. The central support bearing 19 is guided with the slide shoes 20 of the front tilt lever 7 in the control curve 29. The guide continuation is formed by an inner half shell 12a and an outer half shell 12b, which can be joined together to form a closed guide continuation and, in the mounted state, define in each case a guide profiling which is curved in an S-curve-shaped manner for each of the opposite slide shoes 20 of the support bearing 19. As can be seen by way of FIGS. 2a to 2d and 3a to 3d, the guide continuation 12a, 12b serves the purpose of moving the front tilt lever 7 horizontally rearward initially by a certain amount out of an end position which is situated below the lower guide plane 5b before the support bearing 19 including the tilt lever 7 is raised and displaced into the upper guide plane 5a. As a result, it is possible to move the movable roof part 2 out of its closed position initially under a sealing lip, which acts at the front on the roof part, before the roof part 2 is raised.

Whereas the support bearing of the front tilt lever 7, when the roof part 2 is closed, is accordingly situated in the guide curve 29 of the guide continuation 12a, 12b below the level of the lower guide plane 5b, the guide carriage 10, even in said front end position, is also already arranged in the upper guide plane 5a. In the closed end position of the roof part 2, the rear control carriage 9 is moved in such a manner under the control lever 11 that the support web arrangement 30 holds the support cam 32 of the control lever 11 from below pressed into the latching recess R of the upper guide plane 5a of the guide rail arrangement 5.

To start the opening operation, the flex shaft 13 moves the control carriage 9 rearward along the guide rail arrangement 5, as a result of which the two slide bolts 22, 23 are moved in the curved control linkage 25 such that the rear tilt lever 8 is actuated upward (see FIGs. 2*b*, 3*b* and 2*c*, and 3*c*). The roof part 2 is consequently tilted obliquely upward.

As at the start of the displacement of the control carriage 9 the control lever 11 remains locked in the latching recess R of the guide rail arrangement 5, and the guide carriage 10, together with the front tilt lever 7, also remains in its front end position. When the control carriage 9 is moved further rearward, the support web of the control lever 11 slides downward along a curvature of the support web arrangement 30 of the control carriage 9 until the support web arrangement 30 releases the downward movement of the control lever 11 into a support recess into which the support cam 32 of the control lever 11 is inserted. In the region of its bottom surface, the control lever 11 additionally comprises a recess 28 which, with the support cam 32 inserted into the recess of the support web arrangement 30, engages behind a stop 31 of the control carriage 9. The inevitable movement downward of the control lever 11 on account of the removal of the supporting load from below is effected as a result of the effort of the control lever 11 to move downward from its pre-tensioned upper position into its non-tensioned rest position. With the positive locking engagement of the support cam 32 in the recess of the support web arrangement 30 and the engagement behind between the recess 28 and the stop 31, the control lever 11 and the guide carriage 10 are connected to the control carriage 9 in a positive locking manner so as to transmit movement. A further movement rearward of the control carriage 9 accordingly leads to an entrainment of the control lever 11 and of the guide carriage 10 also rearward. As a result, the support bearing 19 slides rearward and upward with its slide shoes 20 in the guide curve 29 until the support bearing 19 with its slide shoes 20 has also reached the upper guide plane 5*a*. In this case, on account of the inevitable kinematics, the front tilt lever 7 is also tilted upward such that the fastening profile 6 is tilted entirely upward together with the movable roof part 2 and is able to be moved rearward (see FIGS. 2*d* and 3*d* in conjunction with FIGS. 10*a* and 10*b*).

The roof part 2 is transferred from the rearwardly moved open position back into its closed position as a result of a correspondingly reversed movement. In this case, the support web arrangement 30 presses the control lever 11 back into the latching position inside the latching recess R as soon as the front end position of the front tilt lever 7 has been reached again in the region of the guide curve 29 of the guide continuation 12*a*, 12*b*.

Figure 11:
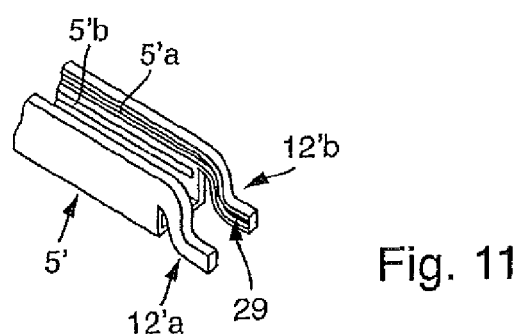
FIG. 11 shows a schematic representation of a front part of the guide rail arrangement with integrally molded continuations.

FIG. 11 shows a guide rail arrangement 5' which has been modified with respect to the guide rail arrangement 5 according to FIGS. 1 to 10*b* and which can be used as an alternative to the guide rail arrangement 5 in the case of the roof system 1 described beforehand by way of FIGS. 1 to 10*b*. The essential difference in the case of the guide rail arrangement 5' is that the front linkage elements are not developed as separate linkage inserts as in the case of the embodiment according to FIGS 1 to 10*b*, but are designed rather as integrally molded continuations 12'*a*, 12'*b*.

In an identical manner the continuations 12'*a*, 12'*b* also define a guide curve 29, as was the case with the embodiment described beforehand. The integral form of the continuations 12'*a*, 12'*b*, which are also designated as guide continuations, is effected as a result of the guide rail arrangement 5' being produced from metal, in particular from a light metal alloy. The guide rail arrangement 5' is designed substantially as a sturdy U--profile body. In its front region, in which the continuations 12'*a*, 12'*b* are formed, a lower cross web of the U-profile body is removed such that the continuations 12'*a*, 12'*b* project forward integrally from the side wall regions of the guide rail arrangement 5'. The continuations 12'*a*, 12'*b* form forwardly projecting fingers which can be bent as a result of plastic deformation corresponding to the desired guide curve 29. A guide groove, which transfers into the upper guide plane 5' a of the guide rail arrangement 5' in an analogous manner to the embodiment described beforehand, is provided in each of the continuations 12'*a*, 12'*b*. The finger-shaped continuations 12'*a*, 12'*b* can be interconnected at the front as a result of a cross-bracing means.

The invention claimed is:

1. A roof system for a motor vehicle having a fixed roof cutout and having a movably mounted roof part for closing and opening the roof cutout which is displaceable by a tilt and guide mechanism between a closed position, a tilt position and an open position, wherein the tilt and guide mechanism includes on both sides of the roof part, when viewed in the direction of travel of the motor vehicle, a front tilt lever and a rear tilt lever, each of which are pivotably connected to the roof part by a pivot point and are operatively connected to a control carriage which is movable in a guide rail arrangement, wherein each guide rail arrangement comprises two guide planes which are arranged one above the other and are parallel to one another, wherein a guide carriage of the front tilt lever is arranged so as to be longitudinally displaceable in one guide plane and the control carriage and the rear tilt lever are mounted so as to be longitudinally displaceable in the other guide plane, wherein the front tilt lever is mounted on the guide carriage by way of a pivot point, the rear tilt lever is mounted on the control carriage, and the guide carriage includes a control lever which comprises a latching element which latches in a latching recess of the guide rail arrangement and an entrainment portion by which the guide carriage is entrainable by the control carriage in the longitudinal direction of the guide rail arrangement.

2. The roof system as claimed in claim 1, wherein the control lever is guided so as to be movable between a latching position in the latching recess and an entrainment position on the control carriage.

3. The roof system as claimed in claim 2, wherein the control lever is arranged integrally on the guide carriage and is comprised of elastic material.

4. A roof system for a motor vehicle having a fixed roof cutout and having a movably mounted roof part for closing and opening the roof cutout which is displaceable by a tilt and guide mechanism between a closed position, a tilt position and an open position, wherein the tilt and guide mechanism includes on both sides of the roof part, when viewed in the direction of travel of the motor vehicle, a front tilt lever and a rear tilt lever, each of which are pivotably connected to the roof part by a pivot point and are operatively connected to a control carriage which is movable in a guide rail arrangement, wherein each guide rail arrangement comprises two guide planes which are arranged one above the other and are parallel to one another, wherein a guide carriage of the front tilt lever is arranged so as to be longitudinally displaceable in one guide plane and the control carriage and the rear tilt lever are mounted so as to be longitudinally displaceable in the other guide plane, wherein the front tilt lever includes a support bearing for transferring the front tilt lever from a front guide continuation into the one guide plane of the guide rail arrangement, wherein the support bearing is formed by two slide shoes which flank the front tilt lever on an inside thereof and on an outside thereof.

5. The roof system as claimed in claim 1, wherein the guide carriage is produced from plastics material as a bearing block for the pivot point of the front tilt lever, and the control lever is connected integrally to the bearing block and projects rearward in the direction of the control carriage.

6. A roof system for a motor vehicle having a fixed roof cutout and having a movably mounted roof part for closing and opening the roof cutout which is displaceable by a tilt and guide mechanism between a closed position, a tilt position and an open position, wherein the tilt and guide mechanism includes on both sides of the roof part, when viewed in the direction of travel of the motor vehicle, a front tilt lever and a rear tilt lever, each of which are pivotably connected to the roof part by a pivot point and are operatively connected to a control carriage which is movable in a guide rail arrangement, wherein each guide rail arrangement comprises two guide planes which are arranged one above the other and are parallel to one another, wherein a guide carriage of the front tilt lever is arranged so as to be longitudinally displaceable in one guide plane and the control carriage and the rear tilt lever are mounted so as to be longitudinally displaceable in the other guide plane, wherein the control carriage comprises a control linkage for actuating the rear tilt lever and a support and entrainment profiling for controlling a control lever of the guide carriage between a latching position and an entrainment position.

7. The roof system as claimed in claim 6, wherein the control linkage comprises a plastic-coated metal web.

8. The roof system as claimed in claim 1, wherein a longitudinally extended drive transmitting element cooperates with the control carriage.

9. The roof system as claimed in claim 8, wherein an entrainment cam, which engages in a positive locking manner into a complementary receiving means on the control carriage, is integrally molded on an end-face region of the drive transmitting element.

10. The roof system as claimed in claim 1, wherein the roof part pivot points of the front and of the rear tilt lever are interconnected by means of an integral and dimensionally stable fastening profile which extends along a side edge of the roof part and is fastened on the side edge of the roof part.

11. The roof system as claimed in claim 10, wherein more than two fastening points, at which the fastening profile is fastened on the roof part, are distributed over a length of the fastening profile.

12. The roof system as claimed in claim 4, wherein the guide rail arrangement is provided at a front thereof with two linkage elements which form the front guide continuation, are mirror-symmetrical to one another, are provided for slidingly guiding the slide shoes of the support bearing from a lower rest position into the one guide plane and flank the support bearing on the outside and on the inside.

13. The roof system as claimed in claim 12, wherein the linkage elements are formed as integral continuations of the guide rail arrangement.

14. The roof system as claimed in claim 1, wherein the latching recess is provided with a plastics material insert.

15. The roof system as claimed in claim 4, wherein a longitudinally extended drive transmitting element cooperates with the control carriage.

16. The roof system as claimed in claim 15, wherein an entrainment cam, which engages in a positive locking manner into a complementary receiving means on the control carriage, is integrally molded on an end-face region of the drive transmitting element.

17. The roof system as claimed in claim 6, wherein a longitudinally extended drive transmitting element cooperates with the control carriage.

18. The roof system as claimed in claim 17, wherein an entrainment cam, which engages in a positive locking manner into a complementary receiving means on the control carriage, is integrally molded on an end-face region of the drive transmitting element.

19. The roof system as claimed in claim 4, wherein the roof part pivot points of the front and of the rear tilt lever are interconnected by means of an integral and dimensionally stable fastening profile which extends along a side edge of the roof part and is fastened on the side edge of the roof part, and more than two fastening points, at which the fastening profile is fastened on the roof part, are distributed over a length of the fastening profile.

20. The roof system as claimed in claim 6, wherein the roof part pivot points of the front and of the rear tilt lever are interconnected by means of an integral and dimensionally stable fastening profile which extends along a side edge of the roof part and is fastened on the side edge of the roof part, and more than two fastening points, at which the fastening profile is fastened on the roof part, are distributed over a length of the fastening profile.

21. The roof system as claimed in claim 6, wherein the front tilt lever is mounted on the guide carriage by a pivot point, the rear tilt lever is mounted on the control carriage, and the control lever comprises a latching element which latches in a latching recess of the guide rail arrangement and an entrainment portion by which the guide carriage is entrainable by the control carriage in the longitudinal direction of the guide rail arrangement.

* * * * *